Patented Nov. 8, 1927.

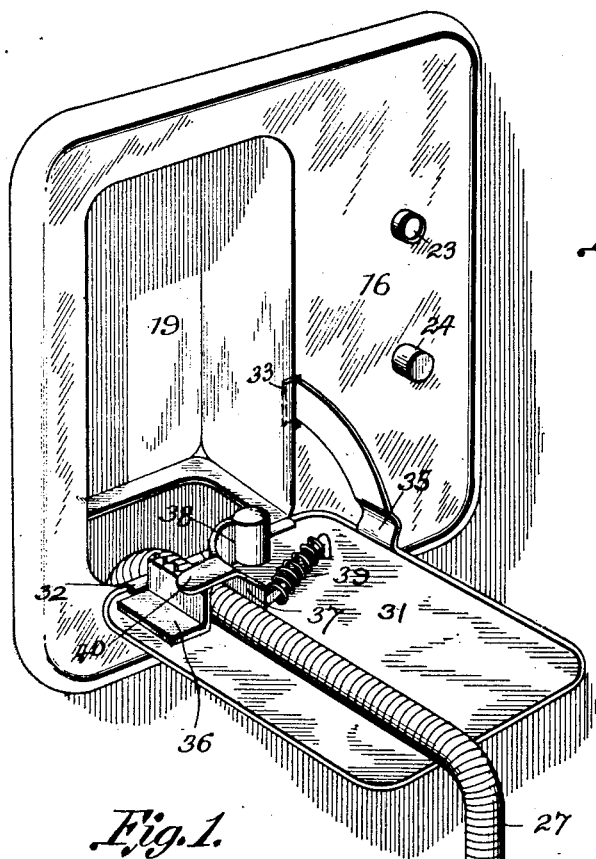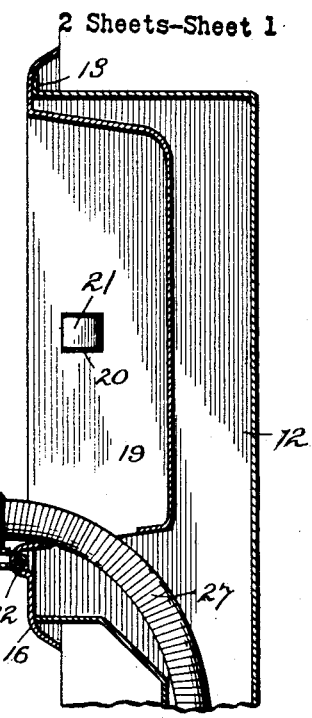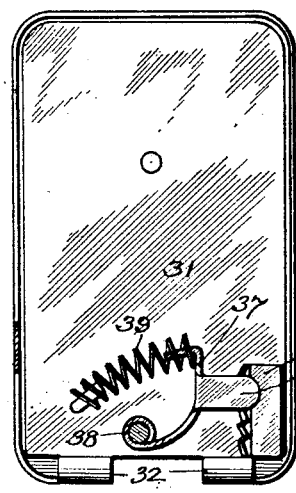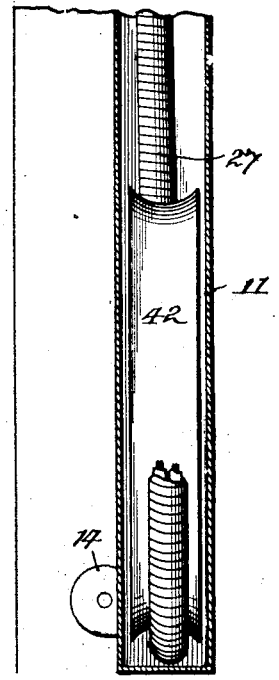

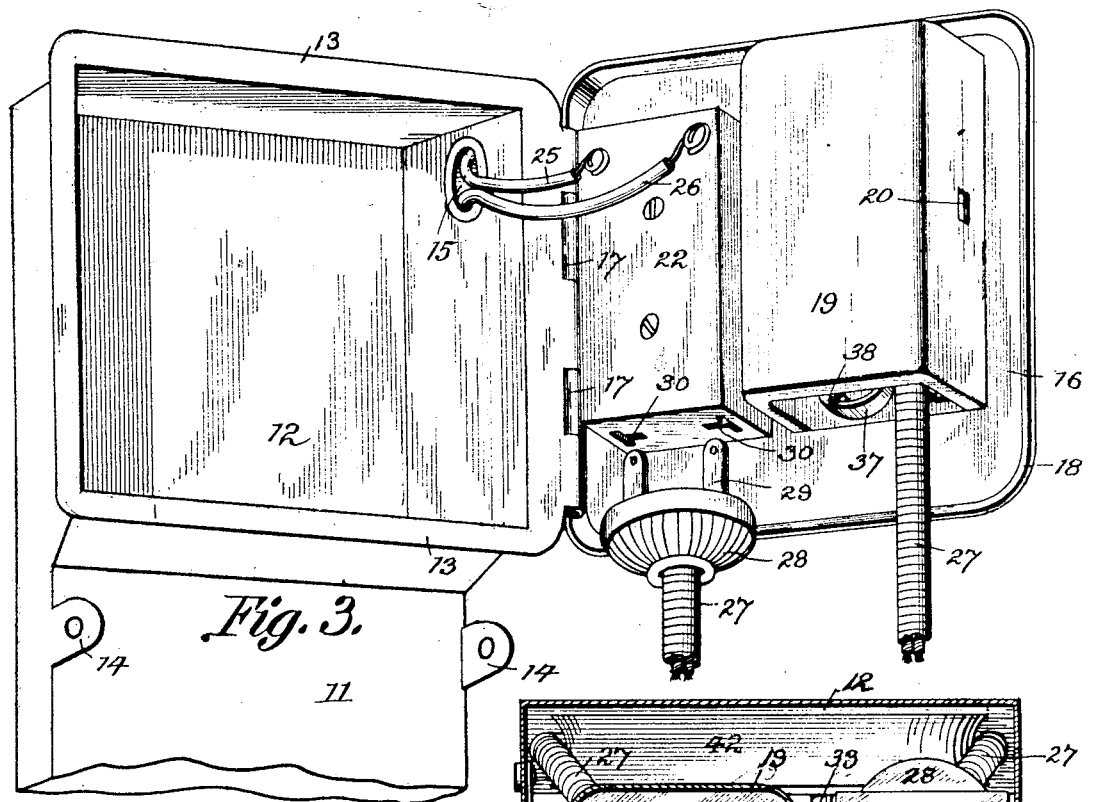
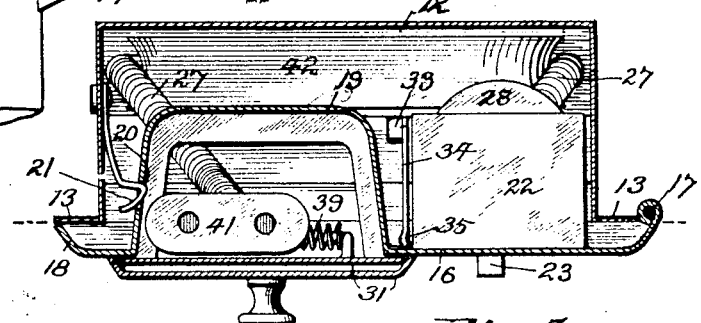
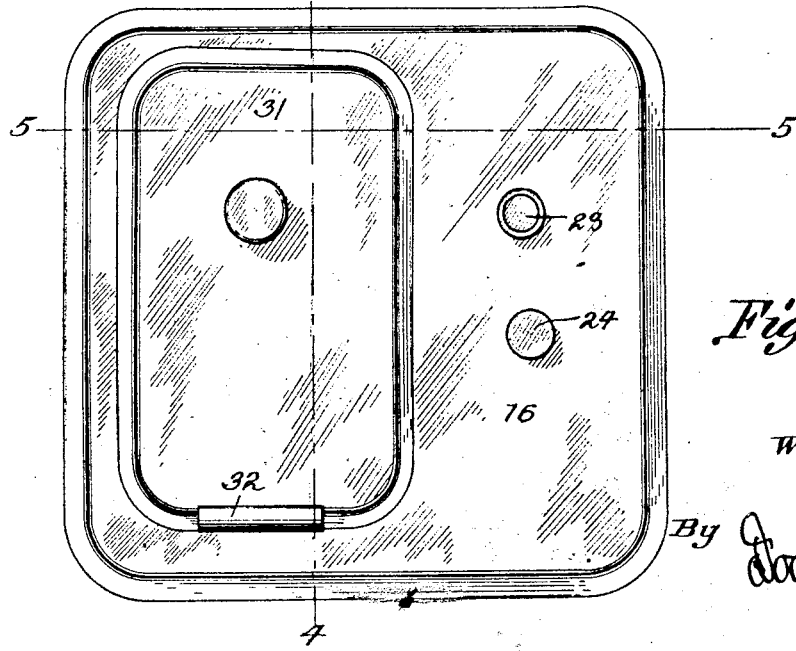

1,648,582

UNITED STATES PATENT OFFICE.

WILLIAM W. DODGE, JR., OF ASHEVILLE, NORTH CAROLINA.

ELECTRIC OUTLET.

Application filed June 28, 1924. Serial No. 722,990.

This invention relates to electrical outlets for use chiefly in dwellings, and provides a cable-retracting outlet of simple and convenient construction.

Many electric utensils, such, for example, as flat irons, are used in a single location and require more or less frequent connection and disconnection. These devices are usually sold complete with connecting cable, and such cables are commonly connected with the utensil by a separable connector whose form varies with the design of the utensil and the preferences of the manufacturer. Consequently, it is a matter of some importance that any wall fitting intended to serve such utensils be capable of operating with the cable furnished with any utensil.

It is equally important that the outlet be capable of connection with the cable in a simple manner readily understood by the ordinary housewife. The inclusion of a switch is a desirable but not indispensable feature.

I have invented a structure which meets these requirements, and the preferred embodiment thereof is illustrated in the accompanying drawings, in which:

Fig. 1 is a perspective view of the outlet mounted in a wall, with the door open and the cable partially withdrawn;

Fig. 2 is a front elevation showing the door closed;

Fig. 3 is a fragmentary perspective showing the upper part of the casing before mounting in the wall, with the front swung out to show the electrical connections and the mode of connecting the cable;

Fig. 4 is a vertical section through the casing. In this view the door is shown open and certain portions of the door and casing are broken away. The plane of section is indicated by the line 4—4 on Fig. 2;

Fig. 5 is a section on the line 5—5 of Fig. 2;

Fig. 6 is an elevation showing the inner side of the door and illustrating the cable clamp.

The casing which is mounted in the wall behind the lath and plaster consists of an elongated vertical well 11 and an outlet box 12, which is at the upper end of the well 11 and projects forward through the plaster so as to be accessible from the room. The box 12 has an open front surrounded by a marginal rim or flange 13. The casing as a whole is supported by ears 14 which are nailed to the studs. Other equivalent modes of support may be substituted. The conducting wires enter the box through an opening 15 to which the usual conduit (not shown) is connected in any convenient manner. In new work, the casing is fixed in place and the conduit is connected to it before plastering.

The front 16 is hinged to the flange 13 at 17 and has an inturned marginal flange 18 which conceals the flange 13. At one side (the left in Fig. 1), the front 16 carries a box or housing 19 which is open at its front, and which projects into the outlet box 12 in the normal closed condition of the front. The box 19 is open at the bottom for the passage of the cable and has an opening 20 in its side to receive the nose of the spring latch 21.

Mounted on the back of the front 16, beside the box 19, is a combined switch and outlet 22. The construction of the switch is not material and is not illustrated. Any commercial type of switch may be used, for example, the familiar one operated in reverse directions by two push butons 23, 24, which project through the front 16 so as to be always accessible.

The leads to the switch are the conductors 25 and 26, which enter the box 12 through the opening 15. The cable 27 may be connected to the combined switch and outlet 22 by any standard plug connector 28, having tongues 29. The connection is made by inserting the tongues 29 into the slots 30 which have the standard T form capable of receiving the various standard plug connectors (i. e. both those in which the tongues 29 are alined as shown in Fig. 3, and those in which the tongues are parallel). In Fig. 3 the connector 28 is shown withdrawn in order to make the construction clear.

The open front of the box 19 is provided with a door 31 which opens down on a hinge 32. It is arrested in horizontal position by a stop lug 33 on the resilient arcuate member 34 which passes through a slot in front 16 and which has a lateral offset 35 serving as a detent to retain the door 31 closed.

Mounted on the inner face of door 31 is a cable clamp comprising a fixed guide 36 and a movable guide 37 which is hinged at 38 to door 31. The guide 37 is urged toward the guide 36 by a spring 39 and has a finger 40 which normally confines the cable but which may be retracted with guide 37 to permit the cable to be removed.

The cable 27, with connector 28 and a second special connector 41 suited to the particular utensil, will ordinarily be furnished with the utensil, though it may be furnished with the outlet.

To put the cable in place, door 31 is opened and latch 21 is forced back to release front 16 which is then swung out. Connector 41 is slipped up through the open bottom of box 19, guide 37 is pulled back, and cable 27 is inserted between the guides. Connector 28 is then attached to the combined switch and outlet 22 by inserting tongues 29 into slots 30.

Cable 27 now hangs in a loop below front 16. This loop is next inserted into well 11 and a weight disc 42, slightly smaller than well 11, is inserted into the well above it. The weight disc 42 draws the cable into the well 11, after which front 16 is closed and latched. In this condition the connector 28 cannot be disconnected as there is not sufficient space between the lower end of combined switch and outlet 22 and the bottom shoulder of outlet box 12. When door 31 is closed the entire cable is housed.

To use the cable, door 31 is opened and cable 27 is drawn out and connected by connector 41 with the utensil, the current being then controlled by pressing the respective switch buttons 23 and 24. To house the cable connector 41 is disengaged and guide 37 is pressed back to release the cable and permit disc 42 to retract it. Then door 31 is closed.

The device is simple and inexpensive in construction, houses the cable in condition for instant use, and may be used with any standard cable, or with a special cable furnished with the wall fitting, as preferred. The invention may be embodied in various forms differing in detail from that illustrated.

What is claimed is:

1. In an electrical wall fitting, the combination of a box constructed and arranged to be mounted in a wall, said box having a front aperture at its upper end opening through the wall and an elongated depending portion extending downward from said opening arranged to house a cable in a pendant loop; an electric outlet receptacle mounted in said box adjacent said opening; a connection plug releasably connected with said receptacle; a conducting cable connected at one end with said plug; a connector fitting connected with the opposite end of said cable and adapted for releasable connection with a utensil; and guiding means arranged to direct said cable into the depending portion of the box and to arrest said connector and sustain the same adjacent said opening.

2. In an electrical wall fitting, the combination of a box constructed and arranged to be mounted in a wall, said box having a front aperture at its upper end opening through the wall and an elongated depending portion extending downward from said opening arranged to house a cable in a pendant loop; an electric outlet receptacle mounted in said box adjacent said opening; a connection plug releasably connected with said receptacle; a conducting cable connected at one end with said plug; a connector fitting connected with the opposite end of said cable and adapted for releasable connection with a utensil; guiding means arranged to direct said cable into the depending portion of the box and to arrest said connector and sustain the same adjacent said opening; and gravity retracting means in said box and engaging said cable.

3. In an electrical wall fitting, the combination of a box constructed and arranged to be mounted in a wall and having a depending elongated approximately vertical extension for housing a cable, said box having an opening through which its interior is accessible; an electrical outlet receptacle mounted in said box adjacent the upper end of said extension; a plug adapted for releasable connection with said receptacle; a closure for the opening of said box arranged to conceal said receptacle and capable of being opened to give access thereto, said closure having a cable passage formed therein; and a conducting cable connected with said plug, housed in said extension and capable of being withdrawn and returned through said cable opening in said closure.

4. In an electrical wall fitting, the combination of an open-fronted box constructed and arranged to be mounted in a wall and having a substantially vertical depending extension for housing a cable; an electrical outlet receptacle mounted in said box; a conducting cable; connectors on the ends of said cable, the first of said connectors being releasably connected with said outlet receptacle, and the second being adapted for connection to a utensil; and a closure for the front of said box having a re-entrant portion arranged to house the second of said connectors, there being an opening through said re-entrant portion leading to said extension and serving for the passage of said cable to and from the same.

5. In an electrical wall fitting, the combination of an open-fronted box constructed and arranged to be mounted in a wall and having a substantially vertical depending extension for housing a cable; an electrical outlet receptacle mounted in said box; a conducting cable; connectors on the ends of said cable, the first of said connectors being releasably connected with said outlet receptacle, and the second being adapted for connection to a utensil; a closure for the front of said box having a re-entrant portion arranged to house the second of said connectors, there being an opening through said re-entrant portion leading to said extension and serving for the passage of said cable to and from the same; and gravity retracting means for drawing said cable into said extension.

6. In an electrical wall fitting, the combination of an open-fronted box constructed and arranged to be mounted in a wall and having a substantially vertical depending extension, for housing a cable; an electrical outlet receptacle mounted in said box; a conducting cable; connectors on the ends of said cable, the first of said connectors being releasably connected with said outlet receptacle, and the second being adapted for connection to a utensil; a closure for the front of said box having a re-entrant portion arranged to house the second of said connectors, there being an opening through said re-entrant portion leading to said extension and serving for the passage of said cable to and from the same; gravity retracting means for drawing said cable onto said extension; a door arranged to close the front of said re-entrant portion and conceal said second connector; and clamping means serving to engage said cable and retain it against the action of said retracting means when withdrawn.

In testimony whereof I have signed my name to this specification.

WILLIAM W. DODGE, JR.